US012777286B2

(12) United States Patent
Zhang et al.

(10) Patent No.: US 12,777,286 B2
(45) Date of Patent: Oct. 27, 2026

(54) DOME AND DIAPHRAGM ASSEMBLY FOR SOUND PRODUCING APPARATUS, SOUND PRODUCING APPARATUS, AND ELECTRONIC DEVICE

(71) Applicant: GOERTEK INC., Weifang (CN)

(72) Inventors: Haitao Zhang, Weifang (CN); Meiling Li, Weifang (CN); Chun Li, Weifang (CN); Chunfa Liu, Weifang (CN); Chengfei Zhang, Weifang (CN)

(73) Assignee: GOERTEK INC., Weifang (CN)

( * ) Notice: Subject to any disclaimer, the term of this patent is extended or adjusted under 35 U.S.C. 154(b) by 114 days.

(21) Appl. No.: 18/846,349

(22) PCT Filed: Feb. 24, 2023

(86) PCT No.: PCT/CN2023/078106
§ 371 (c)(1),
(2) Date: Sep. 12, 2024

(87) PCT Pub. No.: WO2024/001246
PCT Pub. Date: Jan. 4, 2024

(65) Prior Publication Data

US 2025/0203291 A1 Jun. 19, 2025

(30) Foreign Application Priority Data

Jun. 30, 2022 (CN) ......................... 202210772382.4

(51) Int. Cl.
*H04R 7/26* (2006.01)
*H04R 7/04* (2006.01)

(52) U.S. Cl.
CPC ................. *H04R 7/26* (2013.01); *H04R 7/04* (2013.01); *H04R 2307/023* (2013.01); *H04R 2307/025* (2013.01); *H04R 2307/029* (2013.01)

(58) Field of Classification Search
CPC ...... H04R 7/26; H04R 7/04; H04R 2307/023; H04R 2307/025; H04R 2307/029
See application file for complete search history.

(56) References Cited

U.S. PATENT DOCUMENTS 4,410,768 A * 10/1983 Nakamura ............ H04R 7/125 181/170
2005/0089187 A1 * 4/2005 Turnmire .............. H04R 7/125 381/396
2010/0224437 A1 9/2010 Booth et al.

FOREIGN PATENT DOCUMENTS

CN 203261470 U 10/2013
CN 109819379 A 5/2019
(Continued)

OTHER PUBLICATIONS

International Search Report from International Application No. PCT/CN2023/078106 mailed Apr. 19, 2023.

*Primary Examiner* — Andrew Sniezek
(74) *Attorney, Agent, or Firm* — Shih IP Law Group, PLLC

(57) ABSTRACT

Disclosed in the present disclosure are a dome and a diaphragm assembly for a sound producing apparatus, a sound producing apparatus, and an electronic device. The dome comprises an organic aerogel matrix and a reinforcing material dispersed in the organic aerogel matrix. The mass of the organic aerogel matrix accounts for 10% to 95% of the total mass of the dome, and the modulus density ratio of the dome is greater than or equal to 5 GPa·cm$^3$/g. According to the present disclosure, the dome has a light weight, and thus facilitates meeting the design requirements of lightening, thinning and miniaturization of the sound producing apparatus, and can also reduce the resonance frequency of the sound producing apparatus and improve the medium-frequency sensitivity thereof.

13 Claims, 2 Drawing Sheets

(56) References Cited

FOREIGN PATENT DOCUMENTS

| | | | |
|---|---|---|---|
| CN | 110351637 | A | 10/2019 |
| CN | 111417063 | A | 7/2020 |
| CN | 112866879 | A | 5/2021 |
| CN | 213186539 | U | 5/2021 |
| CN | 115134720 | A | 9/2022 |
| JP | H07203584 | A | 8/1995 |
| JP | H08242497 | A | 9/1996 |
| KR | 20070025329 | A | 3/2007 |
| WO | 2022000633 | A1 | 1/2022 |

* cited by examiner

DOME AND DIAPHRAGM ASSEMBLY FOR SOUND PRODUCING APPARATUS, SOUND PRODUCING APPARATUS, AND ELECTRONIC DEVICE

TECHNICAL FIELD

The present disclosure relates to the technical field of electronic devices, and more specifically, to a dome and a diaphragm assembly for a sound producing apparatus, a sound producing apparatus and an electronic device.

BACKGROUND

With the development of science and technology, electronic products are becoming more and more wildly applied. As electronic products become increasingly thin and light, speakers need to further expand their high and low frequency range and mid-frequency sensitivity. That is, speakers need to have a suitable low-frequency resonant frequency, a suitable high-frequency cutoff frequency and good mid-frequency sensitivity.

In the related art, a dome is usually applied to the diaphragm of a loudspeaker to increase the strength of the diaphragm. Traditional domes are usually provided in the form of aluminum foil+adhesive layer+foam+adhesive layer+aluminum foil, which is not only heavy, but also prone to stratification during operation and has poor damping properties, resulting in poor structural stability and mechanical properties of the dome, affecting the service life and acoustic effects of the speaker.

SUMMARY

An object of the present disclosure is to provide a new solution for a dome and a diaphragm assembly for a sound producing apparatus, and a sound producing apparatus and an electronic device.

According to a first aspect of the present disclosure, a dome for a sound producing apparatus is provided, wherein the dome includes an organic aerogel matrix and a reinforcing material dispersed in the organic aerogel matrix. Optionally, a mass of the organic aerogel matrix accounts for 10% to 95% of a total mass of the dome, and a modulus-to-density ratio of the dome is greater than or equal to 5 $GPa \cdot cm^3/g$.

Optionally, the modulus-to-density ratio of the dome is 5 $GPa \cdot cm^3/g$ to 40 $GPa \cdot cm^3/g$.

Optionally, a damping coefficient of the dome is 0.02 to 0.15.

Optionally, a bending modulus of the dome is 0.5 GPa to 15 GPa.

Optionally, a thickness of the dome is 10 μm to 300 μm.

Optionally, the reinforcing material includes reinforcing fibers and/or reinforcing particles.

Optionally, the reinforcing material is reinforcing fibers, and a mass of the reinforcing fiber accounts for 5% to 50% of the total mass of the dome.

Optionally, the reinforcing material is reinforcing particles, and a mass of the reinforcing particles accounts for 5% to 40% of the total mass of the dome.

Optionally, the reinforcing material includes the reinforcing fibers and the reinforcing particles. Optionally, a mass proportion of the reinforcing fibers in the dome is greater than a mass proportion of the reinforcing particles in the dome.

Optionally, the reinforcing fibers are at least one selected from a group consisting of chopped fibers, continuous fibers, fabrics and non-woven fabrics.

Optionally, the reinforcing particles are at least one selected from a group consisting of inorganic particles of boron nitride, silicon carbide, carbon black, and aluminum oxide and metal particles.

Optionally, the organic aerogel matrix is made of at least one material selected from a group consisting of polyimides, polyamides, polyesters, aldehydes, polyolefins, polysaccharides and organosilicon.

According to a second aspect of the present disclosure, a diaphragm assembly for a sound producing apparatus is provided, wherein the diaphragm assembly includes a diaphragm and a dome for the sound producing apparatus according to the first aspect. Optionally, the dome is bonded to the diaphragm, or the dome is integrally injection-molded with the diaphragm.

Optionally, the diaphragm is made of one or more composite materials selected from a group consisting of engineering plastics, elastomeric materials, and adhesive films, and a thickness of the diaphragm is 0.01 mm to 0.5 mm.

According to a third aspect of the present disclosure, a sound producing apparatus is provided, including: the diaphragm assembly according to the second aspect.

According to a fourth aspect of the present disclosure, an electronic device is provided, including: the sound producing apparatus according to the third aspect.

According to one embodiment of the present disclosure, a technical effect of the present disclosure is:

the present disclosure prepares the dome of the sound producing apparatus by dispersing the reinforcing material in an organic aerogel matrix, wherein the organic aerogel matrix is made of high molecular organic material and has a crisscross porous network structure inside, and its mass proportion is limited to a suitable range, so that the prepared dome is light in weight. On the one hand, it is conducive to meeting the design requirements of lightweight and miniaturized sound producing apparatus, and on the other hand, it can also reduce the resonant frequency of the sound producing apparatus and improve its mid-frequency sensitivity.

In addition, the reinforcing material dispersed in the organic aerogel matrix has characteristics such as high strength and high modulus, and the organic aerogel has low-density features, so that the prepared dome has a relatively high modulus density ratio, has both rigidity and damping properties, and has excellent mechanical properties, and when being applied to the sound producing apparatus, can improve the structural stability thereof and obtain a relatively high high-frequency cut-off frequency, thereby improving the acoustic reliability of the sound producing apparatus.

Further features and advantages of the present disclosure will become apparent from the following detailed description of exemplary embodiments of the present disclosure with reference to the attached drawings.

BRIEF DESCRIPTION OF DRAWINGS

The accompanying drawings, which are incorporated in and constitute a part of the specification, illustrate embodiments of the disclosure and, together with the description, serve to explain the principles of the disclosure.

Figure 1:
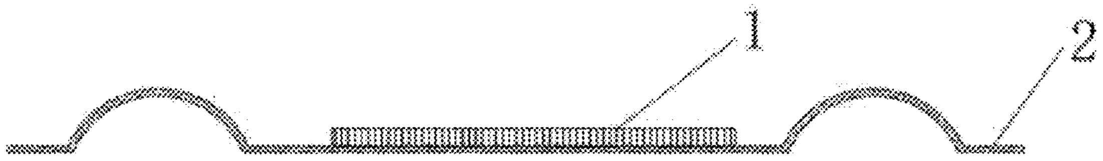
FIG. 1 is a schematic structural diagram of a diaphragm assembly provided by the present disclosure.

1. Dome; 2. Diaphragm.

DETAILED DESCRIPTIONS

Various exemplary embodiments of the present disclosure will now be described in detail with reference to the accompanying drawings. It should be noted that the relative arrangement of components and steps, numerical expressions and numerical values set forth in these embodiments do not limit the scope of the present disclosure unless otherwise specifically stated.

The following description of at least one exemplary embodiment is merely illustrative in nature and is in no way intended to limit the disclosure, its application, or uses.

Technologies, methods, and equipment known to ordinary technicians in the relevant art may not be discussed in detail, but where appropriate, the technologies, methods, and equipment should be considered as part of the specification.

In all examples shown and discussed herein, any specific values should be interpreted as merely exemplary and not limiting. Therefore, other examples of the exemplary embodiments may have different values.

It should be noted that like reference numerals refer to similar items in the following figures, and therefore, once an item is defined in one figure, it need not be further discussed in subsequent figures.

As shown in FIG. 1, the present disclosure provides a dome 1 for a sound producing apparatus, the dome 1 including an organic aerogel matrix and a reinforcing material dispersed in the organic aerogel matrix. The mass of the organic aerogel matrix accounts for 10% to 95% of the total mass of the dome 1, and the modulus-to-density ratio of the dome 1 is greater than or equal to 5 GPa·cm$^3$/g.

Specifically, the dome 1, which is a part of the diaphragm assembly, is generally arranged at the center of the diaphragm 2 to enhance the strength of the diaphragm 2. Therefore, the various properties of the dome 1 play an important role in the sound performance of the entire sound producing apparatus. In some sound producing apparatus, it is needed that the dome 1 satisfies the requirements of low density, high strength and other properties at the same time, to meet the design requirements of the structure and acoustic performance of the sound producing apparatus.

In this embodiment, the reinforcing material is dispersed in an organic aerogel matrix to prepare the dome 1 of the sound producing apparatus, wherein the organic aerogel matrix is prepared by using a polymer organic material, and the organic material type can be selected from polyamides, polyimides, polyesters, polyurethanes, aldehydes, polyolefins, polysaccharides, etc., and has a crisscross porous network structure inside. Compared with traditional materials, such as engineering plastics, it has the advantages of low density, large specific surface area, high porosity, and high specific strength. Thus, the prepared dome 1 has a lighter weight and higher strength, and has better medium and low frequency sensitivity when used in the sound producing apparatus.

The reinforcing material added to the organic aerogel matrix has the characteristics of high strength, high modulus, etc., and has the low density of the organic aerogel, so that the prepared dome 1 has a higher modulus-to-density ratio. Here, the modulus-to-density ratio of the dome=the modulus of the dome/the density of the dome. The larger the modulus-to-density ratio, the larger the high-frequency cutoff frequency, thereby widening the intermediate frequency of the sound producing apparatus, so that the sound producing apparatus can obtain a clear response to the input signal within a wider frequency range, thereby improving the acoustic effect of the sound producing apparatus.

In the above embodiments, the molecular chain segments of the organic aerogel material have polar functional groups, such as oxygen, hydrogen, nitrogen atoms, etc. These polar functional groups interact with the reinforcing material, so that the organic aerogel material can act as an adhesive to bond the dispersed reinforcing materials together. When the dome 1 is subjected to a load, the organic aerogel can act as a medium to disperse the load, and the reinforcing material can increase the strength and modulus of the dome 1. The two interact with each other, so that the prepared dome 1 has a higher modulus-to-density ratio, so that the dome 1 has both rigidity and damping properties, and obtains excellent mechanical properties.

Furthermore, if the proportion of the organic aerogel matrix is too high or too low, the modulus-density ratio of the dome 1 will be affected, and the modulus-density ratio of the dome 1 can be adjusted by the proportion of the mass of the organic aerogel matrix relative to the total mass of the dome 1. When the mass proportion of the organic aerogel matrix is too high, it will affect the proportion of the reinforcing material, resulting in a decrease in the modulus of the dome 1 and a decrease in the mechanical properties. When the mass proportion of the organic aerogel is low, the mass of the dome 1 will be heavier, resulting in a decrease in the modulus-density ratio of the dome 1.

In the present disclosure, the mass proportion of the organic aerogel substrate is set to 10% to 95%. For example, the mass proportion of the organic aerogel substrate can be 10%, 15%, 20%, 30%, 40%, 50%, 60%, 70%, 80%, 90% and 95%, etc. At this time, the proportion of the reinforcing material can also be maintained within an appropriate range, so that the modulus-to-density ratio of the final dome 1 can be greater than or equal to 5 GPa·cm$^3$/g, for example, 5 GPa·cm$^3$/g, 6 GPa·cm$^3$/g, 8 GPa·cm$^3$/g, 10 GPa·cm$^3$/g, 20 GPa·cm$^3$/g, 30 GPa·cm$^3$/g, etc., which can meet the mechanical performance and weight requirements at the same time. When this dome 1 is applied to a sound producing apparatus, it can not only meet its lightweight and miniaturized design requirements, but also take its acoustic performance into account, so that the sound producing apparatus has good mid- and low-frequency sensitivity and a suitable high-frequency cutoff frequency, thereby improving the acoustic reliability of the sound producing apparatus.

Optionally, the modulus-to-density ratio of the dome 1 is 5 GPa·cm$^3$/g to 40 GPa·cm$^3$/g.

Specifically, when the modulus density of the dome 1 is relatively large, the high-frequency cutoff frequency of the sound producing apparatus can be increased. However, when it is too large, it means that there is less organic aerogel material in the dome 1 and more reinforcing material, which easily leads to the mass of the prepared dome 1 being too heavy, which is not conducive to the design requirements of the light and small sound producing apparatus. When the modulus density of the dome 1 is too small, it means that there is more organic aerogel material in the dome 1 and less reinforcing material, which leads to poor structural stability of the dome 1. In this embodiment, the modulus-density ratio of the dome 1 is limited to 5 GPa·cm$^3$/g to 40 GPa·cm$^3$/g, for example, 5 GPa·cm$^3$/g, 8 GPa-cm$^3$/g, 10 GPa·cm$^3$/g, 15 GPa·cm$^3$/g, 20 GPa·cm$^3$/g, 25 GPa·cm$^3$/g, 30 GPa·cm$^3$/g, 40 GPa·cm$^3$/g, etc., which can take into account both the mass and rigidity of the dome 1 and further improve the high-frequency cutoff frequency of the sounding device.

Optionally, the damping coefficient of the dome 1 is 0.02 to 0.15.

Specifically, inorganic silica aerogel is currently used in the art to manufacture the dome 1, but silica aerogel has the disadvantage of being brittle, which will directly lead to a decrease in the acoustic reliability of the prepared sound producing apparatus. In the present disclosure, since the molecules on the molecular chain segments of the organic aerogel material are entangled with each other and the spatial hindrance is large, the internal friction of the material is large. After combining with the reinforcing material, a three-dimensional skeleton structure can be formed. The reinforcing material will also inhibit the shrinkage of the organic aerogel to a certain extent, so that the prepared dome 1 will not collapse during operation. The reinforcing material is dispersed in the organic aerogel matrix to improve the strength of the entire structure, so that the prepared dome 1 has both rigidity and damping properties.

In practical applications, if the damping coefficient of the dome 1 is too high, it is easy to reduce its rigidity, which in turn reduces the response speed of the dome 1 during high-frequency vibration. If the damping coefficient of the dome 1 is too low, it will cause the dome 1 to easily resonate and break during high-frequency vibration, which will cause the high-frequency frequency response curve to be not smooth enough, affecting the acoustic effect of the sound producing apparatus. In this embodiment, the damping of the dome 1 is limited to between 0.02 and 0.15, such as 0.02, 0.03, 0.05, 0.08, 0.09, 0.1, 0.12, 0.13, 0.14, etc., so that the dome 1 has good acoustic performance. The adjustment of the damping coefficient can also be achieved by adjusting the mass of the organic aerogel matrix or the reinforcing material relative to the total mass of the dome 1, and the present disclosure is not limited thereto.

Optionally, the bending modulus of the dome 1 is 0.5 GPa to 15 GPa.

Specifically, during operation of the sound producing apparatus, the stronger the anti-bending deformation ability of the dome 1 is, the less likely the dome 1 is to deform during the vibration process. In the process of preparing the dome 1 of the present disclosure, a reinforcing material is added to the organic aerogel layer matrix, so that the bending modulus of the prepared dome 1 reaches 0.5 GPa to 15 GPa, for example, 0.5 GPa, 0.8 GPa, 1 GPa, 2 GPa, 5 GPa, 8 GPa, 10 GPa, 12 GPa, 14 GPa, 15 GPa, etc., which reduces the risk of excessive deformation of the dome 1 during the vibration process, avoids the phenomenon of polarization of the sound producing component or split vibration under high-frequency vibration, and improves the sound performance of the sound producing apparatus. Preferably, when the bending modulus of the dome 1 is 5.7 GPa, the dome 1 can show excellent anti-deformation ability, has high structural stability, and can improve the sound effect of the sound producing apparatus.

Optionally, the compression modulus of the dome 1 is 0.3 GPa to 8 GPa.

Specifically, during the actual sound producing of the sound producing apparatus, the dome 1 needs to have a certain ability to resist compression deformation in the thickness direction, that is, the dome 1 has a strong ability to resist longitudinal deformation, to ensure the structural stability of the sound producing apparatus during operation. The compression modulus of the dome 1 provided by the present disclosure can be maintained at 0.3 GPa to 8 GPa, such as 0.3 Mpa, 0.5 Mpa, 1 Mpa, 2 Mpa, 5 Mpa, 8 Mpa, etc., which improves the ability of the dome 1 to resist compression deformation while ensuring the quality of the dome 1. The application of the dome 1 in the sound producing apparatus can enable the sound producing apparatus to obtain a better sounding effect.

Optionally, the dome 1 has a thickness of 10 μm to 300 μm.

Specifically, the thickness of the dome 1 will affect the vibration space of the vibration component in the sound producing apparatus. If the thickness of the dome 1 is too large, the vibration space of the vibration component will be reduced, and the maximum amplitude that can be achieved will also be reduced, thereby affecting the sound producing effect. If the thickness of the dome 1 is too small, although a part of the vibration space can be increased, it will cause the overall mechanical strength of the vibration component to decrease, affecting the high-frequency sensitivity of the sound producing apparatus. In this embodiment, an organic aerogel containing a porous network structure is used as the material for preparing the dome 1, so that the thickness of the dome 1 can be maintained at 10 μm to 300 μm, so that the dome 1 can simultaneously control the vibration space of the vibration component and the high-frequency sensitivity of the sound producing apparatus. Preferably, the thickness of the dome 11 is 30 μm to 100 μm, for example, 30 μm, 40 μm, 50 μm, 80 μm, 90 μm, 100 μm, etc.

Particularly, when the thickness of the dome 1 is 30 μm and 50 μm, the mass of the dome 1 is relatively small, and the weight reduction effect of the dome 1 is outstanding, which is suitable for sound producing apparatus with strict quality requirements on the diaphragm assembly. When the thickness of the dome 1 is 100 μm, the mass of the dome 1 is relatively large, but it can further improve the mid-frequency sensitivity and better express the vibration with the diaphragm 2.

Optionally, the reinforcement material includes reinforcement fibers and/or reinforcement particles.

Specifically, in this embodiment, the reinforcing material may be reinforcing fibers, such as chopped fibers, continuous fibers, fabrics, and non-woven fabrics, etc., or reinforcing particles, such as inorganic particles of boron nitride, silicon carbide, carbon black, and aluminum oxide, and metal particles, etc. The reinforcing material may be a combination of one or more reinforcing fiber materials, or one or more reinforcing particles, or reinforcing fibers and reinforcing particles may be mixed at the same time, and the present disclosure is not limited thereto.

Optionally, in one embodiment, when the reinforcing material selects reinforcing fibers, if the content of the reinforcing fibers is too much, it is easy to cause the fibers to be entangled with each other in the organic aerogel matrix, resulting in difficulty in dispersing them in the organic aerogel matrix, affecting the uniformity of the structural strength of each part of the prepared dome 1, and also causing the proportion of the organic aerogel matrix to decrease, which is not conducive to meeting the light weight requirement of the dome 1. If the content of the reinforcing fibers is too little, the purpose of improving the structural strength of the dome 1 cannot be achieved. In this embodiment, the amount of fiber reinforcement material added can be maintained at 5% to 50% of the total mass of the dome 1, such as 5%, 10%, 15%, 20%, 30%, 40%, 50%, etc., which can take into account both the structural uniformity and structural strength of the dome 1.

Optionally, in another embodiment, when the reinforcing material is reinforcing particles, if the content of the reinforcing particles is too much, it is easy to cause the proportion of the organic aerogel substrate to decrease, which is not conducive to meeting the lightweight requirement of the dome 1. If the content of the reinforcing particles is too little, the purpose of improving the structural strength of the dome 1 cannot be achieved. In this embodiment, the mass of the reinforcing particles accounts for 5% to 40% of the total mass of the dome 1, such as 5%, 10%, 15%, 20%, 30%, 40%, etc., which can take both the weight and structural strength of the dome 1 into account.

Optionally, the reinforcing material includes the reinforcing fibers and the reinforcing particles, wherein the mass proportion of the reinforcing fibers in the dome 1 is greater than the mass proportion of the reinforcing particles.

Specifically, in this embodiment, reinforcing fibers and reinforcing particles can be added to the organic aerogel matrix at the same time, wherein the reinforcing fibers can support the organic aerogel matrix and bear most of the load of the dome 1, while the reinforcing particles can constrain the mechanical deformation of the organic aerogel to improve the strength and modulus of the dome 1. The reinforcing fibers and reinforcing particles are respectively combined with the organic aerogel matrix to jointly improve the strength of the dome 1, and by adjusting the ratio of the reinforcing fibers to the reinforcing particles, the mass and modulus of the dome 1 can have higher design convenience.

Preferably, the ratio of reinforcing fiber to reinforcing particle is ≥50%, that is, the content of reinforcing fiber in the dome 1 can be designed to be greater than the content of reinforcing particle, to improve the load-bearing capacity of the dome 1. For example, the mass of reinforcing fiber accounts for 30% of the total mass of the dome 1, and the mass of reinforcing particle accounts for 20% of the total mass of the dome 1.

The present disclosure further provides a diaphragm assembly for a sound producing apparatus, including a diaphragm 2 and the dome 1 of the sound producing apparatus described in the above embodiment, wherein the dome 1 is bonded to the diaphragm 2 or the dome 1 and the diaphragm 2 are integrally injection-molded.

Specifically, the dome 1 can be bonded to the diaphragm 2 by glue or the like, which is easy to implement in terms of technology and has low cost. The dome 1 can also be integrally injection-molded with the diaphragm 2, which has high structural stability and can avoid polarization of the diaphragm assembly during the sound producing process of the sound producing apparatus. Here, the diaphragm 2 can be made of engineering plastics, such as polyetheretherketone (PEEK), PAR, etc., or made of elastomeric materials, such as thermoplastic polyurethane elastomer (TPU), thermoplastic polyester elastomer (TPEE), rubber, etc., and can also be made of adhesive film, such as acrylic adhesive, organosilicon adhesive, etc.

In another embodiment, the diaphragm 2 can also be made of a composite of the above-mentioned materials, and the present disclosure is not limited thereto. In addition, the thickness of the diaphragm 2 can be set between 0.01 mm and 0.5 mm, for example, 0.01 mm, 0.05 mm, 0.1 mm, 0.3 mm, and 0.5 mm.

The above-mentioned diaphragm assembly is applied to a sound producing apparatus. Since its dome 1 has an organic aerogel substrate and reinforcing materials dispersed in the organic aerogel substrate, the mass of the entire diaphragm assembly is relatively light. During the vibration process, the sound producing apparatus is assisted to obtain better low-frequency performance and mid-frequency sensitivity, as well as high-frequency cutoff frequency.

The present disclosure also provides a sound producing apparatus, including the diaphragm assembly in the above-mentioned embodiment, which adopts a diaphragm assembly including the dome 1 provided by the present disclosure, which can meet the design requirements of lightness and miniaturization on the one hand, and has good acoustic performance and acoustic reliability on the other hand.

The present disclosure also provides an electronic device, including the sound producing apparatus in the above embodiment. The electronic device may be a mobile phone, a laptop computer, a tablet computer, a VR (virtual reality) device, an AR (augmented reality) device, a TWS (true wireless Bluetooth) headset, a smart speaker, etc., and the present disclosure is not limited thereto.

To make the technical scheme and corresponding technical effects of the present disclosure clearer, the present disclosure specifically provides the following examples and comparative examples to specifically illustrate the technical scheme.

EXAMPLE 1

This example provided a dome 1 for a sound producing apparatus, which is made of an organic aerogel matrix and a reinforcing material dispersed in the organic aerogel matrix, wherein the material type of the organic aerogel is a polyimide material, and the reinforcing material is a carbon fiber. The specific preparation steps are as follows.

Step 1: Take 50 g of polyamic acid salt to prepare an organic aerogel precursor with a mass fraction (solid content) of 15%.

Step 2: The organic aerogel precursor prepared in the Step 1 is heated to 60° C., take 1.875 g of continuous carbon fiber and to be soaked in the organic aerogel precursor for 30 minutes, add the organic aerogel precursor soaked with carbon fiber into the mold of the dome 1, and hot-pressed at 60° C. for 15 s to obtain the formed dome 1.

Step 3: Freeze the formed dome 1 at −40° C. for 1 hour, and dried at a vacuum degree of <100 Pa for 2 hours.

Step 4: Imidize the dome 1 formed in the Step 3 at 300° C. for 2 h to obtain a carbon fiber organic aerogel dome 1 (hereinafter referred to as the dome 1 of Example 1).

According to the test, in the carbon fiber organic aerogel dome 1 obtained in Example 1, the mass of the organic aerogel matrix accounted for 80% of the total mass of the dome 1.

COMPARATIVE EXAMPLE 1

In this comparative example, a phenolic resin dome 1 (hereinafter referred to as the dome 1 of Comparative Example 1) made of phenolic resin material is provided, the thickness of which is the same as that of the dome 1 of Example 1, and conventional hot pressing is used in the preparation process, and the specific preparation process is omitted.

The thickness, mass, bending modulus, damping coefficient, thermal deformation temperature and modulus-to-density ratio of the dome 1 of the above-mentioned Example 1 and the dome 1 of the Comparative Example 1 are tested, and the results are shown in Table 1.

TABLE 1

Comparison of various parameters of dome 1

| Parameters | Dome of Example 1 | Dome of Comparative Example 1 |
|---|---|---|
| Thickness/μm | 150 | 150 |
| Mass/mg | 21.2 | 32.5 |
| Flexural modulus/GPa | 5.7 | 4.6 |
| Damping coefficient | 0.11 | 0.06 |
| Modulus density ratio/GPa · $cm^3/g$ | 6.21 | 2.92 |
| Heat deformation temperature/° C. | 250 | 120 |

It can be seen from Table 1 that the dome 1 of the same thickness is prepared by using the solution provided by the present disclosure, that is, the dome 1 prepared by using the organic aerogel matrix and the reinforcing material in Example 1, wherein the mass of the organic aerogel matrix accounts for between 10% and 95% of the total mass of the dome 1. In comparison, the mass of the dome 1 of Example 1 is reduced by 11.3 mg compared with the dome 1 of Comparative Example 1. This shows that the dome 1 provided by the present disclosure is more conducive to the design requirements of lightness, thinness and miniaturization.

In addition, the heat deformation temperature refers to whether a material can remain unchanged under high temperature and pressure conditions. The heat deformation temperature is generally used to indicate the short-term heat resistance of a material. The heat deformation determination method used in the present disclosure is the ASTM D648 test method, that is, the dome 1 of Example 1 and the dome 1 of Comparative Example 1 are in an environment of 455 kPa at the center of a standard test piece, and the temperature is increased at 2° C./min until the deformation along the thickness direction of the dome reached 5%, which is the heat deformation temperature.

It can be seen from Table 1 that the bending modulus of the dome 1 of Example 1 is increased by 1.1 GPa compared with the dome 1 of Comparative Example 1, and the thermal deformation temperature is increased by 130° C. This shows that the dome 1 provided by the present disclosure has stronger deformation resistance, higher structural stability, and can be used in a wider temperature range than the traditional dome 1, expanding the use environment of the sound producing apparatus.

It can also be seen from Table 1 that the modulus density ratio of the dome 1 of Example 1 is increased by 3.29 GPa·$cm^3/g$, and the damping coefficient is increased by 0.05 compared with that of Comparative Example 1. This shows that the dome 1 provided by the present disclosure can make the sound producing apparatus have better acoustic effect.

Figure 2:
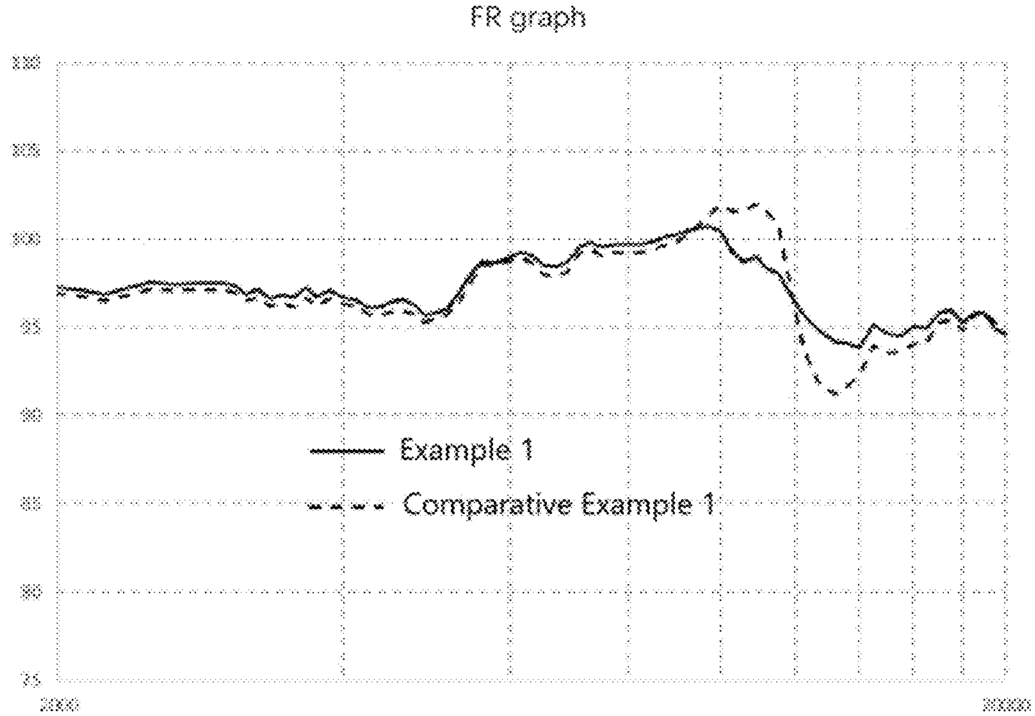
FIG. 2 is a frequency response graph of each sound producing apparatus in Example 1 and Comparative Example 1 provided by the present disclosure.

In order to make the dome 1 provided by the present disclosure more clearly improve the acoustic effect of the sound producing apparatus, the dome 1 of Example 1 and the dome 1 of Comparative Example 1 are respectively assembled with the diaphragm 2 made of the same polyurethane film into a diaphragm assembly, referring to FIGS. 1 and 2, and further assembled into the sound producing apparatus of the same model, and the acoustic performance thereof is tested, and the frequency response (F) graph finally obtained is shown in FIG. 2. Here, the abscissa of the frequency response graph is frequency (Hz), and the ordinate is loudness (dB), and the higher the loudness, the higher the sensitivity.

As can be seen from FIG. 2, the sound producing apparatus made of the dome 1 of Example 1 has a higher mid-frequency sensitivity. When the sound producing apparatus is working, the difference between the peak and the trough of the FR curve of the sound producing apparatus made of the dome 1 of Example 1 is about 6 dB, and the difference between the peak and the trough of the FR curve of the sound producing apparatus made of the dome 1 of Comparative Example 1 is about 10 dB, which shows that the dome 1 of Example 1 has excellent damping properties, making the sound absorption curve smoother, reducing the generation of high-frequency resonance, making the sound producing apparatus have a good listening effect, and is more suitable for applications in the field of high-precision acoustics.

It should be noted that the above embodiments focus on describing the differences between the various embodiments. As long as the different optimization features between the various embodiments are not contradictory, they can be combined to form a better embodiment. Considering the simplicity of the text, they will not be duplicated.

Although some specific embodiments of the present disclosure have been described in detail by way of example, it will be appreciated by those skilled in the art that the above examples are for illustration only and are not intended to limit the scope of the present disclosure. It will be appreciated by those skilled in the art that the above embodiments may be modified without departing from the scope and spirit of the present disclosure. The scope of the present disclosure is defined by the appended claims.

What is claimed is:

1. A dome for a sound producing apparatus, wherein the dome comprises an organic aerogel matrix and a reinforcing material dispersed in the organic aerogel matrix, and wherein a mass of the organic aerogel matrix accounts for 10% to 95% of a total mass of the dome, and a modulus-to-density ratio of the dome is greater than or equal to 5 GPa·$cm^3/g$.

2. The dome for the sound producing apparatus according to claim 1, wherein the modulus-to-density ratio of the dome is 5 GPa·$cm^3/g$ to 40 GPa·$cm^3/g$.

3. The dome for the sound producing apparatus according to claim 1, wherein a damping coefficient of the dome is 0.02 to 0.15.

4. The dome for the sound producing apparatus according to claim 1, wherein bending modulus of the dome is 0.5 GPa to 15 GPa.

5. The dome for the sound producing apparatus according to claim 1, wherein a thickness of the dome is 10 μm to 300 μm.

6. The dome for the sound producing apparatus according to claim 1, wherein the reinforcing material comprises reinforcing fibers and/or reinforcing particles.

7. The dome for the sound producing apparatus according to claim 6, wherein the reinforcing material is reinforcing fibers, and a mass of the reinforcing fiber accounts for 5% to 50% of the total mass of the dome.

8. The dome for the sound producing apparatus according to claim 6, wherein the reinforcing material is reinforcing particles, and a mass of the reinforcing particles accounts for 5% to 40% of the total mass of the dome.

9. The dome for the sound producing apparatus according to claim 6, wherein the reinforcing material comprises the reinforcing fibers and the reinforcing particles, and wherein a mass proportion of the reinforcing fibers in the dome is greater than a mass proportion of the reinforcing particles in the dome.

10. The dome for the sound producing apparatus according to claim 6, wherein the reinforcing fibers are at least one selected from a group consisting of chopped fibers, continuous fibers, fabrics and non-woven fabrics; and/or, the reinforcing particles are at least one selected from a group consisting of inorganic particles of boron nitride, silicon carbide, carbon black, and aluminum oxide and metal particles.

11. The dome for the sound producing apparatus according to claim 1, wherein the organic aerogel matrix is made of at least one material selected from a group consisting of polyimides, polyamides, polyesters, aldehydes, polyolefins, polysaccharides and organosilicon.

12. A diaphragm assembly for a sound producing apparatus, wherein the diaphragm assembly comprises a diaphragm and the dome for the sound producing apparatus according to claim 1, and wherein the dome is bonded to the diaphragm, or the dome is integrally injection-molded with the diaphragm.

13. The diaphragm assembly for the sound producing apparatus according to claim 12, wherein the diaphragm is made of one or more composite materials selected from a group consisting of engineering plastics, elastomeric materials, and adhesive films, and a thickness of the diaphragm is 0.01 mm to 0.5 mm.

* * * * *